The present invention relates to a V-beam radar system and, more particularly, to such a system wherein positional information concerning one or more targets in space is automatically computed and made available for subsequent use.

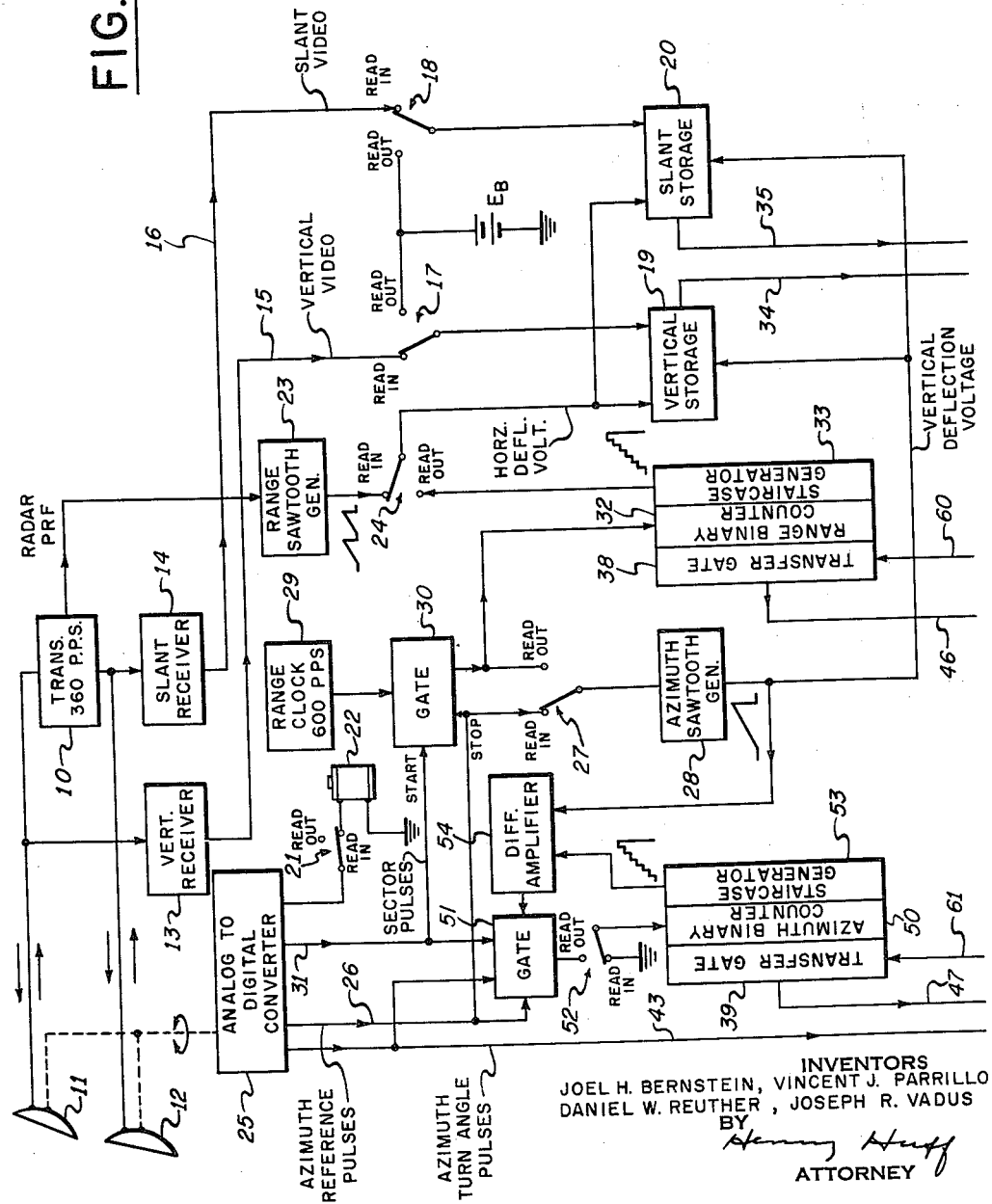

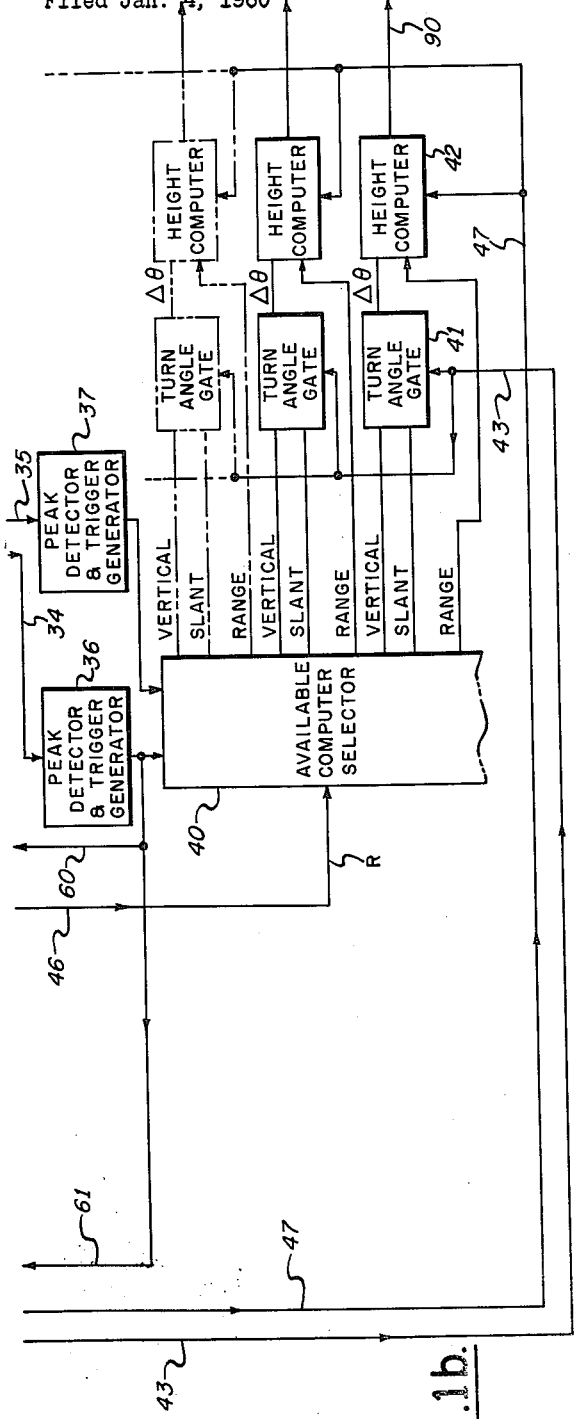
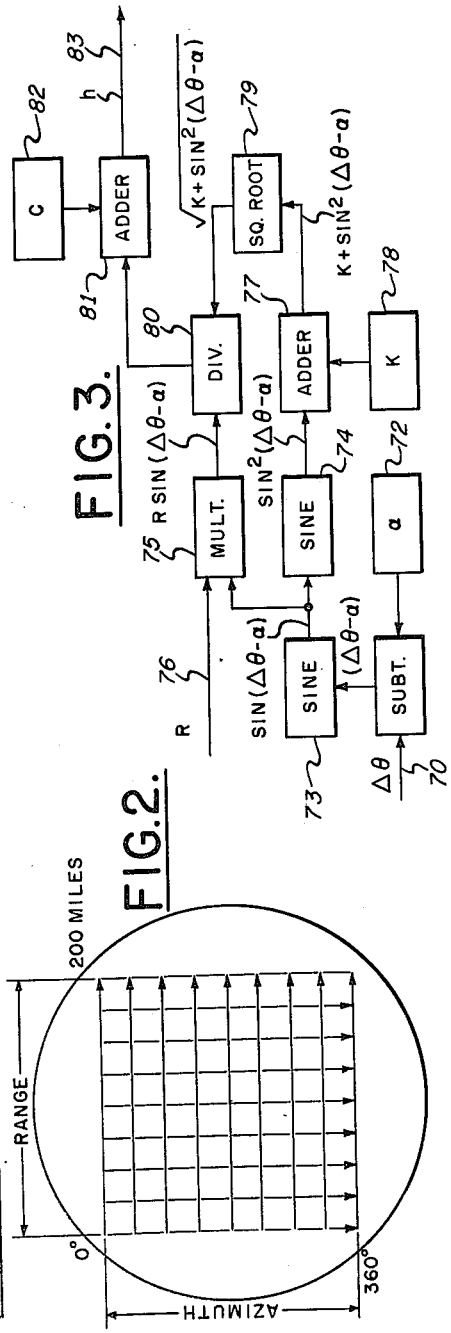
INVENTORS
JOEL H. BERNSTEIN, VINCENT J. PARRILLO
DANIEL W. REUTHER, JOSEPH R. VADUS 3,072,902
V-BEAM RADAR SYSTEM
Joel H. Bernstein, Great Neck, N.Y., Vincent J. Parrillo, Jersey City, N.J., and Daniel W. Reuther, Great Neck, and Joseph R. Vadus, Carle Place, N.Y., assignors to Sperry Rand Corporation, Great Neck, N.Y., a corporation of Delaware
Filed Jan. 4, 1960, Ser. No. 1,154
8 Claims. (Cl. 343—11)

A V-beam radar is employed to obtain positional information, including height information, of remotely located targets and is comprised of two radiators wherein one radiator radiates a vertical sheet-like beam of electromagnetic waves and the other radiator radiates a slant sheet-like beam of electromagnetic waves, the slant beam being inclined at some angle, usually 45°, to the vertical beam. The radiators are fixed with respect to each other and jointly are rotatable in azimuth about a vertical axis preferably, but not necessarily, with the vertical beam in the lead so that a remotely located object within the volume of scan of the beams first is illuminated by the vertical beam and then by the slant beam. The target will be at substantially the same range (R) when each of the radiated beams illuminates the target during an azimuth rotation of the antennas. The azimuth angle through which the radiators must be rotated in order for the vertical and then the slant beam to intercept the target is called the azimuth turn angle ($\Delta\theta$). This angle and the range (R) to the target are all the unknown information required to be obtained in order to determine the height of the target. Reference is made to U.S. Patent 2,704,843 for an explanation of the principle of operation of a height-finding V-beam radar system.

In U.S. patent application 547,828, filed November 18, 1955, in the names of J. Vadus and C. Clothier, and assigned to applicants' assignee, a V-beam radar system is described for determining the true height of a target. In this system only one target can be handled at a time, and manual adjustment must be made to the equipment to acquire detected vertical and slant signals corresponding to a particular target. Such a system has obvious limitations with respect to speed and accuracy of operation, and with respect to the number of targets that can be handled.

These and other disadvantages of the above-mentioned system are overcome in the present invention by providing means for automatically determining the azimuth turn angle of a particular target, and by automatically computing the height after determining the two unknowns. The range of the target is determined in the usual manner by the measured time of return of an echo signal.

The automatic determination of the azimuth turn angle is greatly facilitated by the use of intermediate storage means, two electron beam storage tubes as an example, each coupled to receive respective signals from the vertical or slant beam. Identical electron beam deflection voltages are applied to the vertical and slant storage tubes. During the period of operation when signals are stored in the tubes, the electron beam of each tube is repeatedly swept over its respective storage surface in a direction representing range, and while the beams are sweeping in one direction representing range they are successively positioned in another direction representing azimuth angle. The range sweeping of the electron beams is in synchronism with the pulse repetition frequency of the transmitter and the azimuth positioning of the electron beams is in synchronism with the azimuthal rotation of the antennas.

Because the vertical and slant antenna beams intercept the target at the same range, and because identical deflection voltages are coupled to the storage tubes and the range sweeps are synchronized with the radar transmitter, the detected vertical and slant signals will be stored on the respective tubes at positions representing the same range. With respect to the azimuth position of the stored signals, however, the position of the stored slant signal will represent a greater azimuth angle from the zero reference position than will the position of the stored vertical signal corresponding to the same target. This results from the previously mentioned fact that the target is first illuminated by the vertical beam and then by the slant beam. The stored signals are simultaneously read off the two tubes by electron beams deflected by identical deflection voltages. During read-out, the electron beams make a plurality of complete azimuth sweeps on the storage tube; each individual azimuth sweep being at a fixed range and each successive azimuth sweep being at an increased range. Because the vertical and slant signals corresponding to a given target are stored at positions representing the same range, the vertical and slant signals corresponding to a given target are read off with a time separation between them corresponding to the azimuth turn angle through which the antennas turned in order for the vertical and then slant antenna beams to illuminate that target. Since each azimuth read-off sweep is at a fixed range, targets at different ranges are separated. By determining the time interval between the occurrence of the read-off signals corresponding to a given target, and knowing the other parameters of the radar system, the azimuth turn angle of the given target is directly obtainable.

It is an object of this invention to provide means for obtaining positional information, including height information, on targets located in the sector of scan of a V-beam radar system.

It is a further object of this invention to provide means for automatically determining positional information on a plurality of targets in a sector of scan of a V-beam radar.

Another object of this invention is to provide in a V-beam radar means for quickly and automatically determining the azimuth turn angle of a target.

A further object of this invention is to provide in a V-beam radar an intermediate signal storage means which greatly facilitates the determination of azimuth turn angle of a detected object.

Another object of the invention is to provide in a V-beam radar system means for automatically obtaining three dimensional information on a remotely located object.

The present invention will be described in connection with the accompanying drawings, wherein:

FIGS. 1a and 1b comprise a block schematic diagram of a V-beam radar constructed in accordance with the present invention;

FIG. 2 is a diagrammatic illustration used to help explain the manner in which signals are stored and read off an intermediate storage means employed in the present invention; and FIG. 3 is a representation in block diagram form of a height computer for use with the system of FIG. 1.

Referring now more particularly to FIG. 1a, a radar transmitter 10 provides pulses of electromagnetic waves at a repetition frequency of 360 pulses per second, for example, through dual paths to antennas 11 and 12. Antennas 11 and 12 are adapted to radiate thin sheet-like beams of electromagnetic waves, and are arranged relative to each other so that radiator 11 provides a vertical sheet-like beam of electromagnetic waves and radiator 12 provides a slant sheet-like beam which is inclined at an angle of substantially 45° to the vertical beam. At zero altitude there is a fixed azimuth angle of approximately 10° separation between the two beams. This angle is arbitrary and may be of some other value, or may be eliminated. Radiators 11 and 12 are fixed relative to each other and jointly are rotatable in azimuth about a vertical axis with the vertical beam in the lead so that during the azimuth rotation of said radiators the vertical beam and then the slant beam will illuminate a remotely located object. Antennas 11 and 12 make one complete azimuth revolution each 10 seconds in the example here described.

Echo signals reflected from remotely located objects successively illuminated by the vertical and slant beams are received by the respective antenna 11 and 12 and are coupled to corresponding vertical and slant receivers 13 and 14. Conventional duplexing means, not shown, are employed to direct the respective received signals to receivers 13 and 14. Receivers 13 and 14 respond to the received echo signals to provide corresponding video signals which are coupled over leads 15 and 16, through switches 17 and 18 to respective vertical and slant intermediate storage means 19 and 20. Switches 17 and 18 are closed in the Read-In position during the read-in portion of a cycle of operation, to be explained more fully below, to pass said video signals to storage means 19 and 20. During the read-out cycle of operation, to be explained below, switches 17 and 18 are coupled to a source of potential $E_b$. Storage means 19 and 20 each may be, for example, an electron-beam storage tube such as a "Radechon 6499" barrier-grid storage tube, manufactured by Radio Coporation of America. For a detailed explanation of the construction and operation of this type of storage tube reference is made to pages 197–241 of the RCA Review, volume 16, June 1955. Briefly stated, this storage tube is one in which information is stored on a mica target in the form of electrical charges. The tube has a single electron gun similar to that of a cathode ray tube and the electron beam is positioned by the potentials applied to two pairs of electrostatic deflection plates. The electron beam produced by the gun is directed through a barrier grid and onto the mica storage surface. The voltage difference between the mica surface and the barrier grid controls the secondary emission ratio from the mica surface, making the ratio either greater than or less than unity. In this manner, an electrical charge can be either added to or removed from any point on the mica storage surface. The stored charges are capacitively coupled to the output circuit during read-off operation. In this tube reading also is an erasing action.

During the read-in period, radiators 11 and 12 are rotated in azimuth through a major portion of an azimuth scan, for instance 324° in the example assumed here. The read-out portion of a cycle of operation is carried out during the remaining portion of each complete 360° azimuthal scan of radiators 11 and 12. A switching means illustrated schematically at 21 is associated with the rotating antennas 11 and 12 to energize relay 22 during the read-in portion of a cycle of operation to cause the movable arms of all switches to close in the Read-In position, and to open the connection to relay 22 during the read-out portion of a cycle to cause the movable arms to close in the Read-Out position.

During the read-in period, transmitter 10 provides pulses at the radar repetition frequency of 360 pulses per second to range sawtooth generator 23 which produces a sawtooth waveform in response to each of the pulses from transmitter 10. The sawtooth waveform from range sawtooth generator 23 is coupled through switch 24 to the horizontal deflection plates of the storage means 19 and 20.

Analog-to-digital converter 25 has a mechanical input coupled to the antennas 11 and 12 and produces several digital output signals which are related to the azimuth rotation of said antennas. One of the outputs of converter 25 is an azimuth reference pulse which is produced once each complete azimuth revolution of the antennas 11 and 12. This azimuth reference pulse is produced at a time which corresponds to the initiation of each azimuth scan of the rotating antennas, i.e., zero azimuth angle. Azimuth reference pulses are coupled over lead 26, through switch 27 to azimuth sawtooth generator 28 which responds thereto to produce a sawtooth waveform which has a duration corresponding to the time required for antennas 11 and 12 to scan the azimuthal angle of 324°. The output of azimuth sawtooth generator 28 is coupled to the vertical deflection plates of storage means 19 and 20.

The manner in which signals corresponding to received echo signals are stored on the storage surface of each storage tube is illustrated in FIG. 2. The horizontal direction on the storage surface of a tube corresponds to range and the vertical direction corresponds to azimuth angle. With the deflection voltages applied to the respective horizontal and vertical deflection plates in the manner described above, the electron beam of a storage tube is swept horizontally at a rate of 360 sweeps per second, and is swept vertically once during each rotation of radiating means 11 and 12, or once during each ten seconds. Because of the relationship between radar pulse repetition frequency, range sweeps and azimuth sweep, the signals received from receivers 13 and 14 are stored in respective storage means 19 and 20 as a function of their range at their corresponding azimuth angle. That is, the storage means operate to store signals as a function of range at each of a plurality of successively scanned azimuth angles. Both storage tubes operate in synchronism in the manner just described to store the respective vertical and slant signals.

When radiators 11 and 12 have scanned through an azimuth angle of 324°, mechanical switch 21 will open (by means not shown) to deenergize relay 22, causing all relay switches to switch to the Read-Out position. During this portion of the cycle of operation the voltage coupled to the vertical deflection plates of the storage means 19 and 20 is a recurrent sawtooth waveform which is generated in the following manner. In FIG. 1a, free-running range clock 29 produces clock pulses at a repetition frequency of 600 pulses per second. These pulses are coupled to one input terminal of gate 30, and azimuth sector pulses from analog-to-digital converter 25 are coupled over lead 31 to another input terminal of gate 30. Azimuth reference pulses on lead 26 are coupled to a third input terminal of gate 30. The azimuth sector pulses from analog-to-digital converter 25 occur once each revolution of antennas 11, 12 and are timed to occur when the vertical beam passes through the azimuth angle of 324°, that is, the start of the read-out portion of the cycle of operation. Azimuth sector pulses on lead 31 open gate 30 and azimuth reference pulses on lead 26 close gate 30. Thus, range clock pulses pass through gate 30 only during rotation of the antennas through the azimuth sector between 324° and 360°, i.e., the read-out portion of the cycle of operation. The clock pulses passed by gate 30 are coupled through switch 27 to azimuth sawtooth generator 28 which produces a sawtooth waveform having the repetition frequency of 600 pulses per second. This recurring sawtooth waveform is coupled to the vertical deflection plates of the storage tubes of storage means 19 and 20 to produce successively occurring azimuth sweeps of the electron beam on the storage surface of each tube. The time constant circuits of azimuth sawtooth generator 28 are changed for the read-in and read-out portions of the cycle of operation to produce the desired output waveforms in response to the corresponding input signals. This may be accomplished, for example, by suitable switching means operating in response to relay 22.

During the read-out portion of the cycle of operation, the horizontal deflection voltage coupled to each of the storage means 19 and 20 is a staircase waveform which is produced in the following manner. Range clock pulses at a repetition frequency of 600 pulses per second from range clock 29 pass through gate 30 in the manner just described and are coupled to range binary counter 32 which operates in a known manner to produce a binary indication of the number of clock pulses received. Range binary counter 32 automatically resets itself to zero after it has reached a count corresponding to the most distant range of interest. A staircase generator 33 coupled to range binary counter 32 operates in cooperation with counter 32 to produce a staircase waveform output wherein the increasing steps of the staircase waveform correspond to the increasing count binary counter 32. Circuits which will perform the function of staircase generator 33 in response to the count in a counter are well known to those familiar with the art. An example of one type of circuit which may be employed for this purpose is disclosed in U.S. Patent 2,658,139. The output of staircase generator 33 is coupled through switch 24 to the horizontal deflection plates of the storage tubes of the storage means 19 and 20. This horizontal deflection voltage will cause the electron beam of each storage tube to be successively stepped in range from the minimum range of interest out to the most distant range of interest, for example, 200 miles as indicated in FIG. 2.

Therefore, the deflection voltages applied to each of the storage means 19 and 20 during the read-out portion of the cycle of operation are a sawtooth waveform at a repetition frequency of 600 p.p.s. applied to the vertical deflection plates, and a staircase waveform whose steps rise at a rate of 600 steps per second applied to the horizontal deflection plates. Now referring to FIG. 2, is will be seen that during read-out the electron beam will make successive sweeps in azimuth, each individual azimuth sweep being made at a constant range, and each successive azimuth sweep being made at a progressively greater range out to the most distant range of interest. That is, the stored signals in each tube are read off the storage tubes as a function of azimuth angle at each of a plurality of successively sampled range positions.

Because the vertical and slant signals corresponding to a given target are stored in the respective storage means along individual range sweeps of constant azimuth, thus to cause the vertical and slant signals to be stored in their respective storage means at identical range positions, and because the signals are read off along individual azimuth sweeps of constant range, the vertical and slant signals will be read off the respective storage means with a time separation corresponding to the azimuth turn angle associated with that target.

During read-out, a source of potential $E_b$ is coupled through switches 17 and 18 to the cathodes of the storage tubes of storage means 19 and 20 in order to provide a substantially constant electron beam current, a necessary condition for the read-out operation of the storage tubes described above.

In the event that more storage surface is required for the respective vertical and slant signals than is available in one storage tube, additional storage tubes and the necessary switching means may be provided. As an example, each of a plurality of storage tubes could be operated to store signals received only from an assigned azimuth sector of the total azimuth scan of the radar.

During the read-out sweep of the storage tube electron beams, the signals stored in vertical and slant storage means 19 and 20 are coupled through respective leads 34 and 35 to respective peak detector and trigger generator circuits 36 and 37, FIG. 1b. Each of these circuits functions as a "beam splitter" to produce a pulse signal which occurs substantially at the center of the output signal read off the storage tube. In this manner the position of a target is more accurately determined. Each output pulse signal from vertical peak detector and trigger generator 36 is coupled over leads 60 and 61 to transfer gates 38 and 39, FIG. 1a, associated respectively, with range binary counter 32 and azimuth binary counter 50. Transfer gates 38 and 39 each operate to transfer out a digital signal indicative of the count in its associated counter at the time of occurrence of a vertical pulse signal from peak detector and trigger generator circuit 36. Transfer gates 38 and 39 each may be comprised of a plurality of AND gates, each gate being coupled to a respective stage of a counter, and all gates being coupled to receive the vertical pulse signals from peak detector and trigger generator circuit 36.

The respective vertical and slant signals from peak detector and trigger generator circuits 36 and 37, FIG. 1b, are coupled to available computer selector 40. A digital signal indicative of the count in range binary counter 32 at the time of occurrence of the corresponding vertical signal also is coupled into available computer selector 40 from transfer gate 38. Because the output of staircase generator 33 is generated in response to the count in range binary counter 32, and because the staircase waveform causes the signals to be read off the storage surface in increasing increments of range, the count in binary counter 32 at the time a stored signal is read off is proportional to the range of the target corresponding to that signal.

Available computer selector 40 has a plurality of output leads coupled to subsequent circuits which perform computations to determine the height of the detected objects. Available computer selector 40 functions to determine which of the subsequent computing circuits is operating to compute the height of a previously detected target and thus is unavailable to accept new data, and which of the computing circuits is available to receive new information to perform computation on data relating to a newly detected target. Circuits for performing this function are known in the art, and sometimes are called "hunting" circuits. A circuit capable of performing this function is disclosed in U.S. Patent No. 2,810,098.

Assuming that the circuits 41 and 42 are selected by selector circuit 40, vertical and slant signals are coupled into turn angle gate 41. Azimuth turn angle pulses from analog-to-digital converter 25 at a repetition frequency of two megacycles per second also are coupled into turn angle gate 41 on lead 43. The azimuth turn angle pulses are generated in analog-to-digital converter 25 by means of a pulse generator which produces pulses in response to the azimuthal rotation of antennas 11 and 12. The repetition rate of two megacycles is based on substantially constant angular rotation of the antennas at a rate of six revolutions per minute. Turn angle gate 41 is turned on by the signal from selector 40 which corresponds to the return echo signal received when the vertical beam intercepts a given target, and is turned off by the signal from selector 40 which corresponds to the echo signal received when the slant beam intercepts the same given target. During the time turn angle gate 41 is on, it passes the azimuth turn angle pulses coupled in on lead 43. Because stored signals are synchronously read off the vertical and slant storage tubes in azimuth sweeps of constant range, and because the signals corresponding to a given target are stored in the two tubes at positions representing the same range but different azimuth positions, the number of pulses passed by turn angle gate 41 is a representation of the azimuth turn angle $\Delta\theta$ through which the antennas 11 and 12 turn between the times that the vertical and then the slant beam intercept the given target.

This signal representing the azimuth turn angle $\Delta\theta$ and the digital signal from available computer selector 40 representing the range (R) to the target are coupled to height computer 42 which performs the required computation to derive a digital signal representing the height of the given target. The expression for height may be expressed as follows:

$$h = R \frac{\sin(\Delta\theta - \alpha)}{\sqrt{K + \sin^2(\Delta\theta - \alpha)}} + C$$

where $\alpha$ is a constant representing the angular separation between beams at zero altitude, $K$ is some arbitrary constant, and $C$ is a correction factor to account for the earth's curvature and bending of the radiated beams due to atmospheric refraction.

A general block diagram representation of apparatus for performing the required computation is illustrated in FIG. 3. A signal representing azimuth turn angle $\Delta\theta$ is coupled over lead 70 into subtractor circuit 71, and a binary digital signal representing the initial angular separation between the two beams is coupled from a source 72 into subtractor circuit 71 whose output signal $(\Delta\theta - \alpha)$ is coupled into sine function generator 73. Apparatus capable of accepting digital information representing some angle and producing a binary digital output signal representing the sine of that angle is disclosed in patent application S.N. 749,695, now U.S. Patent 2,995,302, by Ingwerson and Carpentier, filed July 21, 1958, and assigned to applicants' assignee. The $\sin(\Delta\theta - \alpha)$ output of sine generator 73 is coupled to a second similar sine generator 74 to obtain the quantity $\sin^2(\Delta\theta - \alpha)$, and also is coupled to multiplier 75 where it is multiplied with the range term R coupled in one lead 76 to produce the numerator, $R \sin(\Delta\theta - \alpha)$. The sine-squared term from sine generator 74 is added in adder 77 with the constant term K from source 78, and the square root of this sum is taken in square root extractor 79. The output of square root extractor 79 is the denominator of the first term of the height equation. The numerator from multiplier 75 and the denominator from extractor 79 are coupled into divider 80 and the first term of the height equation is obtained. This term is added in adder 81 to the correction factor C generated in a function generator 82, and the height term $h$ is obtained at output terminal 83. The addition, subtraction, multiplication, division, and square root functions may be performed by digital means known in the art. Most texts on digital computers disclose means for accomplishing these functions.

In order to complete the three-dimensional information on a given target the azimuth angle signal in digital form representing the azimuth angle of the rotating antennas (using the position of the leading beam as a reference) from a zero reference angle, is generated during read-out in the following manner. Azimuth sector pulses on lead 31, FIG. 1a, and azimuth reference pulses on lead 26 are coupled from analog to digital converter 25 to gate 51 and function, respectively, as start and stop pulses to place gate 51 in a condition to be enabled by a signal from difference amplifier 54 during the interval between said pulses. Azimuth-turn-angle pulses at a repetition frequency of two megacycles per second also are coupled to gate 51 and are passed therethrough when said gate is enabled. These pulses are coupled through switch 52 to azimuth binary counter 50. Staircase generator 53 is coupled to azimuth binary counter 50 and provides a staircase waveform output corresponding to the count in binary counter 50 in the same manner that previously described staircase generator 33 operates with respect to range binary counter 32. The output of staircase generator 53 is coupled to one input terminal of difference amplifier 54. The other input to difference amplifier 54 is the sawtooth waveform from azimuth sawtooth generator 28 at a repetition frequency of 600 pulses per second. Difference amplifier 54 produces an output signal which is proportional to the difference in amplitude of its two input signals. A difference signal from difference amplifier 54 enables gate 51 and allows azimuth turn angle pulses to pass through said gate to azimuth binary counter 50, while in the absence of a difference signal gate 51 is disabled and prevents azimuth turn angle pulses from passing. Binary counter 50 is adapted to reset itself to zero after it has counted a number of pulses designated to correspond to an azimuth angle of 360°. The counting and recycling operation of azimuth binary counter 50 is synchronized with the azimuth sawtooth generator 28 to assure that the count in counter 50 at the time a signal is read off a storage tube corresponds to the azimuth positions of that same stored signal on a storage tube. The synchronism is accomplished as follows. Assume that gate 51 has received a sector pulse from lead 31 so that it is in a condition to be enabled by a difference signal from difference amplifier 54, and further assume that there is no count in binary counter 50 and that a sawtooth waveform from azimuth sawtooth generator 28 is just commencing. The output of staircase generator 53 now will be at a zero potential, but as the azimuth sawtooth voltage commences to rise the two input signals to difference amplifier 54 will become unequal. A difference signal will be produced by difference amplifier 54 which will enable gate 51, allowing azimuth turn angle pulses to enter counter 50. Staircase generator 53 therefore produces a staircase waveform output whose amplitude is proportional to the count in azimuth binary counter 50. Difference amplifier 54 will continually compare the amplitudes of the staircase and sawtooth waveforms and will either allow or prohibit pulses to be passed to azimuth binary counter 50, depending upon whether or not the staircase waveform is equal to the sawtooth waveform. The operation just described will continue during the read-out portion of the cycle of operation and will be terminated when gate 51 is closed by an azimuth reference pulse received on lead 26. A signal from peak detector and trigger generator 36 corresponding to an echo signal from a target illuminated by the vertical beam, is coupled over lead 61 to actuate transfer gate 39 to read out the signal in azimuth binary counter 50. This azimuth signal is coupled over lead 47 to height computer 42.

Height computer 42 has storage means associated with it for storing height, range and azimuth information, and has means for making this information available at output terminal 90 for subsequent use.

From the above discussion it may be seen that by storing information on intermediate storage means as a function of range at each of a plurality of successively scanned azimuth angles, and then reading off this stored information as a function of azimuth angle at each of a plurality of successively scanned range positions, azimuth turn angle information is readily derived for computing the height of a target detected by a V-beam radar.

While the invention has been described in its preferred embodiment, it is understood that the words which have been used are words of description rather than of limitation and that changes within the purview of the appended claims may be made without departing from the true scope and spirit of the invention in its broader aspects.

What is claimed is:

1. In a V-beam radar system the combination of first and second radiators for radiating, respectively, vertical and slant sheet-like beams of electromagnetic waves, said radiators being jointly rotatable in azimuth about a common vertical axis, first and second receivers each coupled to receive signals reflected from a remotely located object illuminated by a respective one of said beams, first and second information storage means each coupled to a respective one of said receivers for storing signals received by its corresponding receiver, means for causing received signals to be stored in each of said storage means as a function of range at each of a plurality of successively sampled azimuth angles which comprise a continuous sector of an azimuth scan, and means for reading-out said stored signals simultaneously from both of said storage means as a function of azimuth angle at each of a plurality of successively sampled range positions which comprise a substantially continuous range coverage from the minimum range of interest out to a most distant range of interest.

2. The combination as claimed in claim 1 including means for providing successively occurring range signals respectively representing each of said successively sampled range positions, the occurrence of successive range signals being synchronized with the reading out of stored signals at corresponding range positions, whereby read-out signals representing a remotely located object and a signal representing the range of that object are simultaneously available.

3. The combination claimed in claim 2 further including means operable in response to a pair of respective read-out signals corresponding to a given target for producing a signal indicating the azimuth turn angle through which said beams jointly are rotated in order that said vertical and then said slant beam intercept said given target.

4. The combination claimed in claim 3 further including computing means responsive to said range information and said azimuth turn angle information for computing the height of said remotely located object.

5. In a V-beam radar system the combination of first and second radiators for radiating, respectively, vertical and slant sheet-like beams of electromagnetic waves, said radiators being jointly rotatable in azimuth about a common vertical axis, first and second receivers each coupled to receive signals reflected from a remotely located object illuminated by a respective one of said beams during rotation thereof, first and second information storage means each coupled to a respective one of said receivers for storing signals received by its corresponding receiver, means operable during a major portion of a complete azimuth rotation of said radiators for causing respective received signals to be stored in their corresponding storage means as a function of range at each of a plurality of successively sampled azimuth angles which comprise a continuous sector of an azimuth scan, means operable during the remaining portion of a complete azimuth rotation of said radiators for reading out said stored signals simultaneously from both of said storage means as a function of azimuth angle at each of a plurality of successively sampled range positions which comprise a substantially continuous range coverage from a minimum range of interest to a most distant range of interest, and means operating in response to said read-out signals corresponding to said remotely located object for providing an output signal representing the azimuth turn angle through which said radiators are rotated in order that said vertical and slant beams successively illuminate said remotely located object.

6. In a radar system wherein electromagnetic waves are radiated into space in a V-shaped radiation pattern comprised of vertical and slant sheet-like radiation beams which jointly are rotated in azimuth about a common vertical axis, and in which reflected waves from remotely located objects are received in first and second receivers each coupled to receive signals from a respective one of said beams, comprising in combination first and second electron beam storage tubes each coupled to a respective one of said receivers for storing signals received by its corresponding receiver, means for causing said signals to be stored in their respective storage tubes along range sweeps of constant azimuth wherein said range sweeps are successively positioned in azimuth to correspond to the azimuthal position of said rotating beams, and means simultaneously operable on both of said storage tubes for reading out the stored signals in azimuth sweeps of constant range wherein said azimuth sweeps are successively positioned in range from a storage position corresponding to a minimum range of interest to a storage position corresponding to the most distant range of interest.

7. In a radar system wherein electromagnetic waves are radiated into space in a V-shaped radiation pattern comprised of vertical and slant sheet-like radiation beams which jointly are rotated in azimuth about a common vertical axis, and in which reflected waves from remotely located objects are received in first and second receivers each coupled to receive signals from a respective one of said beams, comprising in combination first and second electron beam storage tubes each coupled to a respective one of said receivers for storing signals received by its respective receiver, means for storing said signals in their corresponding storage tube along range sweeps of constant azimuth wherein said range sweeps are succesively positioned in azimuth to correspond to azimuthal position of said rotating beams, means simultaneously operable on both of said storage tubes for reading out the stored signals in azimuth sweeps of constant range wherein said azimuth sweeps are successively positioned in range from a storage position corresponding to the minimum range of interest to a storage position corresponding to the most distant range of interest, means coupled to said two storage tubes for responding to respective signals from said two tubes corresponding to a given remotely located object to produce an output signal in digital form representing the azimuth turn angle between the two points of the respective beams where they intercept said given remotely located object, means for providing a signal in digital form representing the range to said given remotely located object, means responsive to said signal representing the azimuth turn angle between said two points and to said range signal to produce an output digital signal representing the height of said given remotely located object, and means for providing a signal in digital form representing the azimuth position of said vertical beam when it intercepts said given remotely located object.

8. In a radar system wherein electromagnetic waves are radiated into space in a V-shaped radiation pattern comprised of vertical and slant radiation beams which jointly are rotatable in azimuth about a common vertical axis, and in which reflected waves from remotely located objects are received in first and second receivers each coupled to receive signals from a respective one of said beams, comprising in combination first and second storage means each coupled to a respective one of said receivers for storing saignals received by the corresponding receiver, means for storing received signals in each of said storage means as a function of range at each of a plurality of successively scanned azimuth angles and means for reading out said stored information simultaneously from both of said storage means as a function of azimuth angle at each of a plurality of successively sampled range positions which comprise a substantially continuous range coverage from the minimum range of interest out to a most distant range of interest, means operable in response to a pair of respective read-out signals corresponding to a given target for producing a signal representing the azimuth turn angle through which said beams jointly are rotated in order that both said beams intercept said given target, means operable in synchronism with said read-out means for providing a signal representing the range position at which the stored signals are being read off said storage means, and means responsive to said range signal and said azimuth turn angle signal for computing the height of said given target.

No references cited.